F. E. SLOCOMBE.
APPARATUS FOR GRINDING AND POLISHING PLATE GLASS.
APPLICATION FILED SEPT 26, 1918.

1,384,278.

Patented July 12, 1921.
2 SHEETS—SHEET 1.

INVENTOR.
F. E. Slocombe
By Rogers, Kennedy & Campbell
attys

F. E. SLOCOMBE.
APPARATUS FOR GRINDING AND POLISHING PLATE GLASS.
APPLICATION FILED SEPT. 26, 1918.

1,384,278.

Patented July 12, 1921.
2 SHEETS—SHEET 2.

INVENTOR,
F. E. Slocombe
By Rogers, Kennedy & Campbell
Attys

UNITED STATES PATENT OFFICE.

FRANK EDWIN SLOCOMBE, OF ST. HELENS, ENGLAND, ASSIGNOR TO PILKINGTON BROTHERS LIMITED, OF ST. HELENS, ENGLAND, A LIMITED LIABILITY COMPANY OF GREAT BRITAIN.

APPARATUS FOR GRINDING AND POLISHING PLATE-GLASS.

1,384,278.   Specification of Letters Patent.   Patented July 12, 1921.

Application filed September 26, 1918. Serial No. 255,729.

*To all whom it may concern:*

Be it known that I, FRANK EDWIN SLOCOMBE, a subject of the King of the United Kingdom of Great Britain and Ireland, and residing at "Stockswell," Hard Lane, St. Helens, in the county of Lancaster, England, have invented new and useful Improvements in or Relating to Apparatus for Grinding and Polishing Plate-Glass, of which the following is a specification.

This invention relates to apparatus for grinding and (or) polishing plate glass and has for its object to provide an improved form of sucker device for fixing the glass on to the table or disk on which it is to be ground or polished.

Heretofore it has generally been the custom to secure glass plates on the grinding or polishing tables by bedding them down on to a layer of cement laid on the table or on to a layer of some soft fabric. To prevent the glass flying off under centrifugal force, a ring of holes is provided at the edge of the table into which wooden pegs are driven, and the spaces between the plates of glass to be ground or polished and these wooden pegs are filled in with pieces of glass.

According to this invention, the glass plates are held on to the surface of the table by suckers of an improved form attached to the table, so constructed as to flatten any plate which may have become curved or buckled in the annealing, and so obviate the need for a bedding material such as above mentioned.

Suckers, adapted to adhere to glass by forming a partial vacuum in them have been customarily employed for lifting glass plates and have been proposed for securing glass plates on to tables. They have not, however, been commercially employed for this latter purpose because the sucker devices heretofore proposed have not been able to draw the glass plates on to the surface of the table with sufficient force to flatten any curved or buckled plate, so that at the junction between two plates there may be no risk of the surface of one plate projecting above that of the next and forming a projecting edge which would be caught by the part which rubs on the surface to grind it.

In sucker devices as heretofore constructed, the sucker is caused to adhere to the glass by means of a vacuum formed either by an air exhausting pump or by stretching the sides of a rubber cup, and the sucker is then pulled in a direction perpendicular to the surface of and away from the glass in order to draw the latter on to the table. The force with which the sucker is so pulled, must always be less than that causing it to adhere to the glass, and, since this latter force varies with the degree of vacuum and with the tightness of the joint between the sucker and the glass, a considerable margin of force must be allowed between that pulling the sucker away from the glass and that causing the sucker to adhere to the glass, in order to meet the varying conditions of vacuum.

With such devices therefore the pressure obtainable between glass and table must be considerably less than that corresponding to a good vacuum in the sucker, and any failure in the exhausting pump or vacuum system which leads, even momentarily, to the said margin of force being passed, brings about the complete detachment of all the suckers from the glass which then is liable to fly off the table.

The essential feature of the sucker device constructed according to this invention is that there is no force tending to draw the sucker away from the glass. A vacuum is produced in the sucker device which causes atmospheric pressure to press the glass on to the sucker and also on to the table and, of the total atmospheric pressure corresponding to the vacuum, the proportions employed to press the glass on to the table and to press it on to the sucker may be given any desired values by making the parts of the sucker device of suitable relative dimensions. Further, if the vacuum be reduced by any partial failure of the vacuum system, the pressures between glass and table and between glass and sucker become reduced in the same proportions and there is therefore never any tendency for the sucker to become detached from the glass. Thus, should a complete failure of the vacuum system occur, the full pressures are reëstablished as soon as the vacuum is reëstablished, so long as the glass remains on the table.

Figure 1:
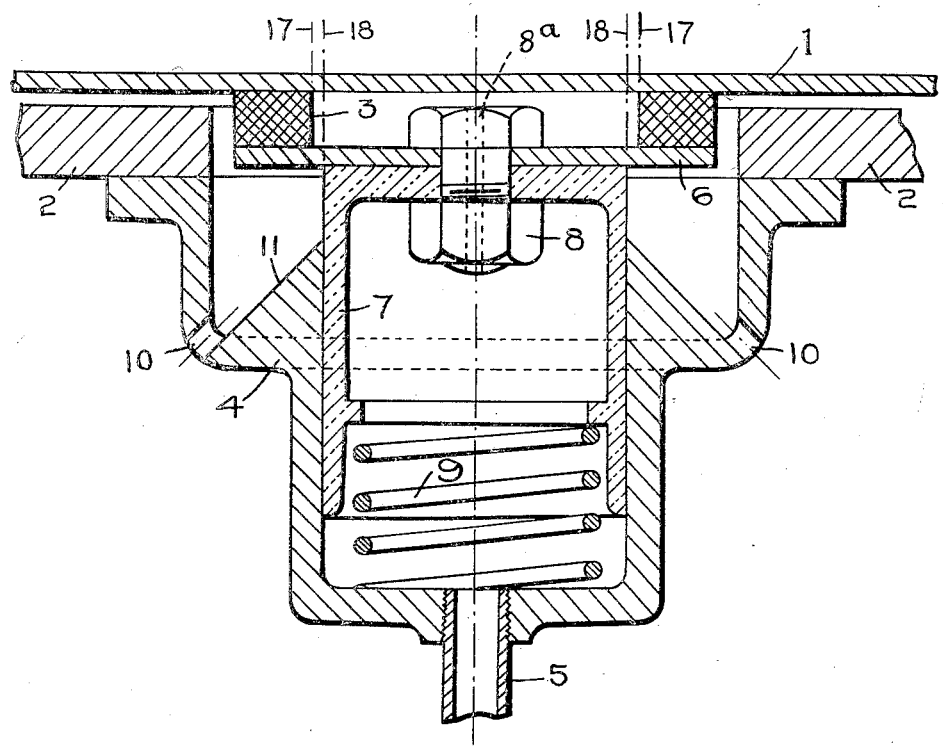
Figure 1 is a vertical section through one form of the improved sucker device.

In all the figures are shown portions of the table to which the sucker devices are attached.

Referring to the drawings, 1 is a plate of glass, and 2 is the grinding or polishing table, 3 is a rubber ring on which the glass rests, 4 is a casting attached to the table and 5 a pipe fixed to the casting 4 and leading to the air-exhausting pump.

Referring to Fig. 1, the rubber ring 3 is attached to a disk 6, which is secured to the top of a piston 7 by a bolt 8, which is bored to provide a passage $8^a$ for connecting the space inside the rubber ring 3 with the inside of the piston 7. The piston 7 works in a cylinder formed in the casting 4, and is normally kept by a spring 9 in a position such that the top of the rubber ring 3 projects slightly above the surface of the table 2.

The glass having been laid upon the table, so that it rests upon the top of the rubber ring 3, the air from within the cylinder and piston 7 and the inside of the rubber ring is exhausted. The glass 1 is thereby caused, by atmospheric pressure, to be pressed down upon the rubber ring 3 and simultaneously therewith the rubber ring 3 and the piston 7 are pressed down, the latter sliding into the cylinder until the glass comes against the surface of the table 2.

Now let it be assumed (for the sake of simplicity of language) that there is only a single sucker on the plate of glass and that the vacuum is perfect. Then the total pressure on the glass is the weight of the atmosphere above the area within the inner edge of the surface of the rubber ring 3 which is in contact with the glass. This area may be termed the operative area of the sucker and its limits are indicated in the drawings by dotted lines 17, 17. When the glass is in contact with the table, the pressure between glass and table is the weight of the atmosphere above the area within the inner surface of the cylinder in which the piston 7 works. This area may be termed the operative area of the cylinder, and its limits are indicated in the drawings by the dotted lines 18, 18. The pressure between the glass 1 and the rubber ring 3 is therefore the difference between the total pressure on the glass and the pressure between glass and table (neglecting the weight of the glass where this is in a horizontal plane).

The total pressure on the glass may therefore be split up in any desired proportions into the two pressures between glass and table and between glass and rubber ring, by constructing the device so that the operative area of the cylinder and the excess area above this of the operative area of the sucker, are in these desired proportions, or, in other words, so that the area between the lines 18, 18 and that between these lines and the lines 17, 17 are in these desired proportions.

Further, neglecting the pressure of the spring 9, these proportions remain the same whatever be the vacuum, and the effect of a reduced vacuum due to partial failure of the vacuum system, is not to detach the rubber ring 3 from the glass, but to diminish the pressure between glass and table, while the glass and rubber ring remain always in contact, though with a correspondingly reduced pressure between them.

Since therefore a partial failure of the vacuum system need not lead to a serious accident, the risk of its occurring need not be provided against, and a small proportion of the total pressure available may, by the dimensions of the device, be allocated to the contact between the glass 1 and rubber ring 3, and the maximum pressure commercially possible is therefore obtained between glass and table.

By the provision of a suitable number of suckers on the table, the pressure between glass and table can be made sufficient to prevent any tendency of the glass to slide on the table under centrifugal force, while any curved or buckled plates are flattened against the surface of the table.

Now, in grinding and polishing glass, abrasives, such as sand, emery and rouge are employed with water, and it is impossible to prevent the water carrying particles of the abrasive, from reaching the surface of the table 2, and thence the holes in which the suckers are located, either through gaps between the plates of glass or at portions of the table not covered with glass, or in washing the table after the glass has been removed. If any abrasive reaching the sucker holes, found its way to the sliding surfaces designed to prevent the ingress of air into the sucker or to guide the sucker support, these would wear rapidly and the device would soon cease to operate properly.

The invention, therefore, includes means whereby any abrasive entering the sucker holes, is prevented from reaching the said sliding surfaces.

In the form of device shown in Fig. 1, these means consist in the drain holes 10, the sloping or conical surface 11 and the part of the disk 6 which projects over the sloping surface 11. The drain holes 10 prevent any accumulation of the abrasive in the casting 4 and the projecting part of the disk 6 prevents any abrasive falling upon the exposed surface of the piston 7 or its line of contact with the conical surface 11.

Figure 2:
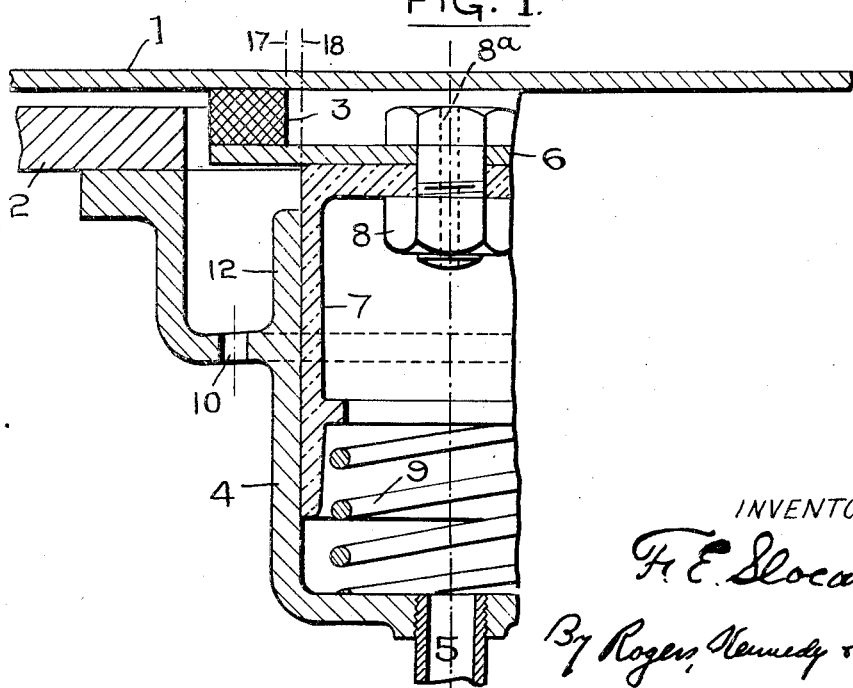
Fig. 2 is a part, approximately a half vertical section of a form of the improved sucker device with modified protective means.

In the alternative form of the device shown in Fig. 2, the conical surface 11 of Fig. 1 is replaced by a cylindrical portion 12 in which the piston 7 slides, whereby the exposed portion of the piston is limited to a small length close under the projecting part of the disk 6, and clear of the channel drained by the holes 10 into which the abrasive can fall.

Figure 3:
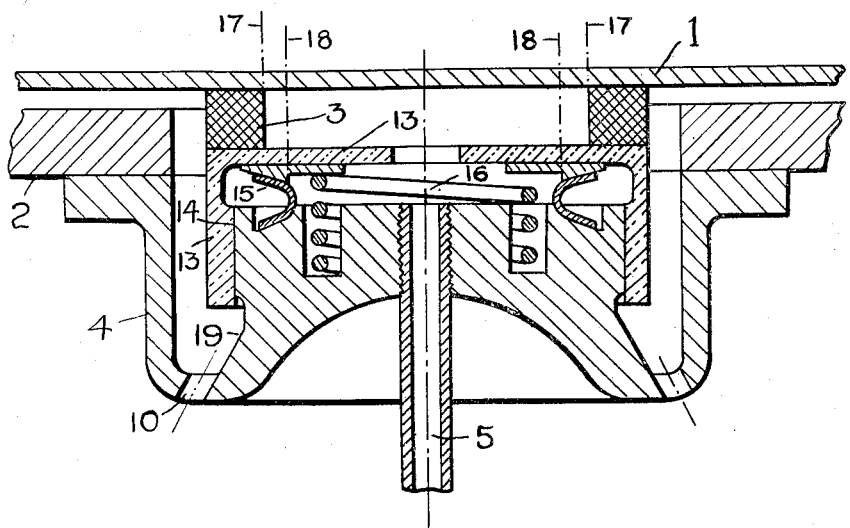
Fig. 3 is a section of a modified form of the said sucker device.

Fig. 3 shows a third form of the device in which the rubber ring 3 is attached to an inverted cup 13, which is guided in its movement at right angles to the plane of the glass 1 by a cylindrical surface 14 of the casting 4. The surface 14 may form an air-tight joint with the inner surface of the wall of the cup 13, but preferably it acts only as a guide, either the surface 14 of the casting 4 or that of the inner wall of the cup being provided on ribs spaced apart at suitable distances about the axis of the cup 13.

The ingress of air into the sucker is prevented by a rubber or equivalent ring 15 which is inserted between the cup 13 and the casting 4 and makes an air-tight joint between the two. The rubber ring 15 thus forms with the surfaces of the cup 13 and the casting 4, a collapsible chamber virtually corresponding to the cylinder and piston of Figs. 1 and 2, and its operative area is indicated by the dotted lines 18, 18.

A spring 16 performs the same function as does the spring 9 of Figs. 1 and 2.

The sliding surface 14 is protected from abrasive by the drain holes 10 and the sloping surface 19 of the casting 4.

The invention is not confined to the particular constructions illustrated and described: the construction of the sucker device may be varied within wide limits provided always that the total pressure on the glass corresponding to the vacuum is split up, in accordance with the relative dimensions of the parts, into the pressures between glass and table and between glass and sucker which always bear a fixed proportion to each other.

The invention has the advantages that the glass is held to the table more firmly than with cement, that the glass can be held on to vertical and inverted tables and that curved and buckled plates are flattened.

In the following claims, it is assumed that the pressure of the spring 9 or 16, tending to keep the upper surface of the rubber ring 3 slightly above the surface of the table 1 is negligible in comparison with the atmospheric pressures acting on the glass. Further, the term "rubber ring" is intended to include any equivalent thereto, such as a ring of leather impregnated with water or oil.

Having described my invention, I declare that what I claim and desire to secure by Letters Patent is:—

1. In a sucker device adapted to hold glass on to a grinding or polishing table the combination with a sucker movable relatively to the table and to which the glass is attached by atmospheric pressure, of pneumatic means operatively connected to the sucker for allowing the glass to be pressed against the table by atmospheric pressure, the relative areas of the glass and pneumatic means which are subjected to the said pressure being such that, of the total atmospheric pressure on the glass due to whatever degree of vacuum there may be in the sucker device, a portion determined by the dimensions of the latter operates to press the glass on to the table while the remainder presses the glass on to the sucker.

2. In a sucker device for holding glass on to a grinding or polishing table, the combination with a sucker consisting of a rubber ring whose interior is adapted to be exhausted of air and to which, when so exhausted, the glass is attached by atmospheric pressure, and a support for the said ring, of a suction device having a chamber between the said support and a part of the table, pneumatically connected to the interior of the ring, the suction device operating, when the interior of the ring is exhausted of air, to move the support relatively to the table by atmospheric pressure.

3. In a sucker device for holding glass on to a grinding or polishing table, the combination with a sucker consisting of a rubber ring whose interior is adapted to be exhausted of air and to which, when so exhausted, the glass is attached by atmospheric pressure, and a support for the said ring, of a suction device having a chamber between the said support and a part of the table, pneumatically connected to the interior of the ring, the relative areas of the glass and suction device exposed to suction being such that the glass will be pressed by atmospheric pressure onto the table with a force inferior to that by which it is attached to the ring.

4. In a sucker device for holding glass on to a grinding or polishing table, the combination with a sucker consisting of a rubber ring whose interior is adapted to be exhausted of air and to which, when so exhausted, the glass is attached by atmospheric pressure, and a support for the said ring, of a cylinder and piston, one operatively connected to the said support and the other connected to a part of the table, the space between them being pneumatically connected to the interior of the ring.

5. In a sucker device for holding glass on to a grinding or polishing table, the combination with a rubber ring whose interior is adapted to be exhausted of air and to which when so exhausted, the glass is attached by atmospheric pressure, of a piston and piston chamber operatively and pneumatically connected to the ring, the piston chamber being adapted to be exhausted of air, the relative areas of the glass and piston exposed to suction being such that the glass will be pressed by atmospheric pressure onto the table with a force inferior to that by which it is attached to the ring.

6. In a sucker device for holding glass on to a grinding or polishing table, the combination with a sucker adapted to adhere to the glass, of a piston attached to the sucker, and a cylinder fast to the table, the spaces within the sucker and cylinder being connected together and to a means for exhausting the air and the operative area of the sucker being greater than that of the cylinder.

7. In a sucker device for holding glass on to a grinding or polishing table, the combination with a sucker adapted to adhere to the glass, of a guide fast to the table and a cup working over the guide, the spaces within the sucker and cup being pneumatically connected together and to a means for exhausting the air, and the operative area of the sucker being greater than that of the cup.

8. In a sucker device for holding glass on to a grinding or polishing table, the combination with a sucker adapted to adhere to the glass, of a collapsible chamber to which the said sucker is attached, and of which the lower portion is attached to the table, the walls of said collapsible chamber being formed of a collapsible ring, the spaces within the sucker and chamber being pneumatically connected together and to a means for exhausting the air, and the operative area of the sucker being greater than that of the chamber.

9. In a sucker device for holding glass on to a grinding or polishing table, the combination with a sucker adapted to adhere to the glass and means operatively and pneumatically attached to the sucker for pneumatically moving said sucker and glass relatively to the table, of guiding means restricting said movement to a direction at right angles to the plane of the glass, and means adapted to prevent the access of abrasive falling from the table to the said guiding means.

10. In a sucker device for holding glass on to a grinding or polishing table, the combination with a sucker adapted to adhere to the glass, a guide fast to the table and a cup in air-tight connection with the table working over the guide, the spaces within the sucker and cup being pneumatically connected together and to a means for exhausing the air, and the operative area of the sucker being greater than that of the cup, of a spring normally holding the glass-engaging surface of the sucker beyond the surface of the table.

11. In a sucker device for holding glass on to a grinding or polishing table, the combination with a sucker adapted to adhere to the glass, and a chamber formed of a collapsible ring, attached to the said sucker, and of which the lower portion is attached to the table, of a spring normally holding the glass-engaging surface of the sucker beyond the surface of the table, the spaces within the sucker and chamber being pneumatically connected together and to a means for exhausting the air, and the operative area of the sucker being greater than that of the chamber.

12. In a sucker device for holding glass on to a grinding or polishing table, the combination with a sucker adapted to adhere to the glass and means operatively and pneumatically attached to the sucker for moving said sucker and glass relatively to the table, guiding means restricting said movement to a direction at right angles to the plane of the glass, and means adapted to prevent the excess of abrasive falling from the table to the said guiding means, of a spring normally holding the glass-engaging surface of the sucker beyond the surface of the table.

13. In a sucker device for holding glass on to a grinding or polishing table, the combination with a sucker adapted to adhere to the glass and means operatively and pneumatically attached to the sucker adapted to move the sucker and glass relatively to the table, of a casting fast to the table, a guide on the casting for the sucker-moving means, a channel surrounding the guide accessible to abrasive leaving the table, and drain holes in the bottom of the channel for the egress from the latter of the abrasive.

14. In a sucker device for holding glass on to a grinding or polishing table, the combination with a sucker adapted to adhere to the glass, a disk fast to the underside of the sucker and means overhung by the edge of the disk and fast to the latter adapted to move the sucker and glass relatively to the table, of a casting fast to the table, a guide on the casting for the sucker-moving means, a channel surrounding the guide and overhung by the edge of the disk and accessible to abrasive leaving the table, and drain holes in the bottom of the channel for the egress from the latter of the abrasive.

15. In a sucker device for holding glass on to a grinding or polishing table, the combination of a sucker adapted to adhere to the glass, a piston operatively fast to the sucker adapted to move the sucker and piston relatively to the table, means pneumatically connecting together the spaces within the sucker and beneath the piston, a casting fast to the table, a cylinder in the casting within which the piston is axially movable, means adapted to exhaust air from the cylinder and sucker, a channel surrounding the cylinder accessible to abrasive leaving the table, drain holes in the bottom of the channel for the egress from the latter of the abrasive, and a spring normally holding the glass-engaging surface of the sucker above the surface of the table.

16. In a sucker device for holding glass on to a grinding or polishing table, the combination of a sucker adapted to adhere to the glass, a disk fast to the underside of the sucker, a piston operatively fast to the sucker overhung by the edge of the disk and adapted to move the sucker and glass relatively to the table, means pneumatically connecting together the spaces within the sucker and beneath the piston, a casting fast to the table, a cylinder in the casting within which the piston is axially movable, means adapted to exhaust air from the cylinder and sucker, a channel surrounding the cylinder and overhung by the disk accessible to abrasive leaving the table, drain holes in the bottom of the channel for the egress from the latter of the abrasive, and a spring normally holding the glass-engaging surface of the sucker above the surface of the table.

In testimony whereof I have affixed my signature hereto.

FRANK EDWIN SLOCOMBE.